(12) United States Patent
Kojima et al.

(10) Patent No.: US 7,903,695 B2
(45) Date of Patent: Mar. 8, 2011

(54) OPTICAL FIBER LASER AND EXCITING METHOD USING SAME

(75) Inventors: Seiji Kojima, Hitachi (JP); Bing Yao, Hitachi (JP); Kazumasa Ohsono, Hitachi (JP); Akihito Hongo, Hitachi (JP); Akio Sato, Toyota (JP); Kohei Yanaka, Nishikamo (JP); Kazuo Hasegawa, Nisshin (JP); Daisuke Inoue, Nagoya (JP); Hiroshi Ito, Kasugai (JP); Tadashi Ichikawa, Nagoya (JP); Kazuya Saito, Nagoya (JP)

(73) Assignees: Hitachi Cable, Ltd., Tokyo (JP); Toyota Jidosha Kabushiki Kaisha, Aichi (JP); Toyota School Foundation, Aichi (JP)

(*) Notice: Subject to any disclaimer, the term of this patent is extended or adjusted under 35 U.S.C. 154(b) by 0 days.

(21) Appl. No.: 12/274,463

(22) Filed: Nov. 20, 2008

(65) Prior Publication Data

US 2009/0129411 A1 May 21, 2009

(30) Foreign Application Priority Data

Nov. 20, 2007 (JP) ................................. 2007-300861

(51) Int. Cl.
*H01S 3/30* (2006.01)

(52) U.S. Cl. ............. 372/6; 385/123; 385/124; 385/125; 385/126; 359/341.1

(58) Field of Classification Search ...................... 372/6; 385/123–126; 359/341.1
See application file for complete search history.

(56) References Cited

U.S. PATENT DOCUMENTS

| | | | | |
|---|---|---|---|---|
| 5,923,694 A | * | 7/1999 | Culver | 372/69 |
| 6,052,392 A | * | 4/2000 | Ueda et al. | 372/6 |
| 6,345,141 B1 | * | 2/2002 | Grubb et al. | 385/127 |
| 6,533,883 B1 | | 3/2003 | Tanaka et al. | |
| 6,795,460 B1 | * | 9/2004 | Itoh | 372/34 |
| 6,798,792 B2 | * | 9/2004 | Itoh | 372/6 |
| 2002/0001320 A1 | * | 1/2002 | Itoh | 372/6 |
| 2002/0172236 A1 | * | 11/2002 | Sekiguchi et al. | 372/6 |

FOREIGN PATENT DOCUMENTS

| | | |
|---|---|---|
| JP | 11-238928 | 8/1999 |
| JP | 2001-015841 | 1/2001 |
| JP | 2001-036170 | 2/2001 |

* cited by examiner

*Primary Examiner* — Minsun Harvey
*Assistant Examiner* — Yuanda Zhang
(74) *Attorney, Agent, or Firm* — Antonelli, Terry, Stout & Kraus, LLP.

(57) ABSTRACT

An optical fiber laser, according to the present invention, has an optical fiber including a core to which a rare earth element is added and a clad disposed around the core, and also has an excitation light source for emitting excitation light incident on a side of the optical fiber. The optical fiber has a corrugated shape on the outer circumference of the clad along the longitudinal direction thereof; and the optical fiber is wound in a spiral form and is bundled in such a way that adjacent sides of the clad are brought into contact with one another.

5 Claims, 4 Drawing Sheets

OPTICAL FIBER LASER AND EXCITING METHOD USING SAME

CLAIM OF PRIORITY

The present application claims priority from Japanese patent application serial no. 2007-300861 filed on Nov. 20, 2007, the content of which is hereby incorporated by reference into this application.

BACKGROUND OF THE INVENTION

1. Field of the Invention

The present invention relates to an optical fiber laser for emitting excitation light incident on a side of an optical fiber having a gain core which is used as a gain medium and relates to a method of excitation by the optical fiber laser. In particular, the present invention relates to an optical fiber laser for efficiently focusing excitation light in the gain core and relates to a method of excitation by using the optical fiber laser.

2. Description of the Related Art

Development of a high-output, inexpensive light source intended to be used for laser processing or in medical applications is demanded. To meet this demand, much attention is paid to optical fiber lasers and optical amplifiers such as optical fiber amplifiers since they are highly efficient and can obtain single-mode laser light with ease.

Double-clad fibers (DCFs) are generally used, which have a core to which a rare earth element is added as a gain medium. Exemplary excitation methods of the optical fiber laser in which a laser bar emits excitation light to the double-clad fiber include: a method in which a combiner is used so as to converge incident excitation light from a plurality of light sources; another method in which a fiber bundle is fused and excitation light is incident on segments of the fiber bundle; another method in which a micro lens is used to cause excitation on an end surface; and another method in which a tapered light guide is used to enter excitation light.

In the above methods, however, it becomes necessary to provide a combiner, a fiber bundle, a micro lens, a light guide, and other optical devices between the laser bar and double-glad fiber. The use of these intervening optical devices is problematic in that they are expensive and light emitted from the laser bar is lost by the optical devices before the light reaches the double-clad fiber.

Thereto, Tanaka et al. disclose in JP-A-2001-36170 (U.S. Pat. No. 6,533,883) that a laser in which: a laser fiber wound in a spiral form is integrated into one piece by heating thermoplastic resin; a plurality of lens ducts with excitation light laser diodes are attached to the outer circumferential side of the resulting optical conductor; and laser light beams amplified by emitting excitation light are obtained. However, since the laser disclosed in JP-A-2001-36170 needs many lens ducts with excitation light laser diodes, it cannot be said that the amplification efficiency of the laser is high.

SUMMARY OF THE INVENTION

Under these circumstances, the present invention is originated to address these problems. It is an objective of the present invention to provide an optical fiber laser that can cause excitation on a side of the double-clad fiber in a highly efficient manner. Furthermore, it is another objective of the invention to provide a method of excitation by the optical fiber laser.

(1) In an optical fiber laser, according to one aspect of the present invention, that has an optical fiber including a core to which a rare earth element is added and a clad disposed around the core, and also has an excitation light source for emitting excitation light incident on a side of the optical fiber, the optical fiber has a corrugated shape on the outer circumference of the clad along the longitudinal direction of the optical fiber; and the optical fiber is wound in a spiral form and is bundled in such a way that adjacent sides of the clad are brought into contact with one another.

In the above aspect (1) of the present invention, the following modifications and changes can be made.

(i) The optical fiber is wound in such a way that the positions of a concave part and convex part of the clad do not match.

(ii) The amplitude of the corrugated shape of the clad is 10% or less of the diameter of the clad.

(2) According to another aspect of the present invention, in a method of excitation with an optical fiber laser that has an optical fiber comprising a core to which a rare earth element is added and a clad disposed around the core for outputting laser-excited light beams, the method includes irradiating excitation light to a side of the optical fiber and exciting the rare earth element included in the core, in which the optical fiber has a corrugated shape on the outer circumference of the clad along the longitudinal direction of the optical fiber; and the optical fiber is wound in a spiral form and is bundled in such a way that adjacent sides of the clad are brought into contact with one another.

ADVANTAGES OF THE INVENTION

According to the present invention, excitation of the optical fiber laser comprising the double-clad fiber by excitation light incident on their sides can be efficiently carried out.

DETAILED DESCRIPTION OF THE PREFERRED EMBODIMENTS

A preferred embodiment of the present invention will be described below with reference to the accompanying drawings. However, the present invention is not limited to the embodiments described herein.

Figure 1:
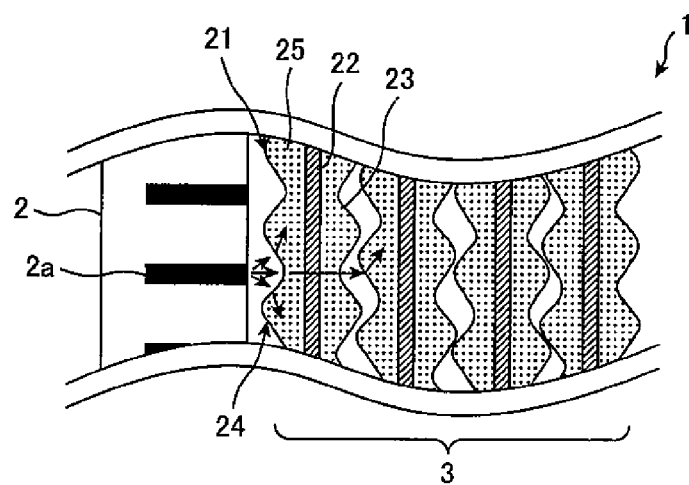
FIG. 1 is a schematic illustration showing a plane cross sectional view of important elements in an optical fiber laser that embodies the present invention.

FIG. 1 is a schematic illustration showing a plane cross sectional view of important elements in an optical fiber laser that preferably embodies the present invention. As shown in FIG. 1, the optical fiber laser 1 includes an optical fiber 21, which has a clad 23 with a corrugated shape along the longitudinal direction of the optical fiber 21; the optical fiber 21 is bundled so that its adjacent sides are brought into contact with one another, forming an optical fiber bundle 3. The optical fiber laser 1 also includes a laser bar 2 as an excitation light source from which excitation light is emitted to a side of the optical fiber bundle 3.

The optical fiber 21 includes a core (gain core) 22 to which a rare earth element is added as a gain medium, the core 22 being surrounded by the clad 23, which has corrugated parts 24 in the corrugated shape along the longitudinal direction of the optical fiber 21. The clad 23 receives excitation light (pump light beams) and propagates them along the longitudinal direction of the optical fiber 21. That is, the optical fiber 21, comprising the core 22 and the clad 23 formed on the outer circumference of the core 22, causes the excitation light propagating in the clad 23 to be absorbed into the core 22 and to be amplified. The core 22 is formed by adding Ge (germanium) or another material that raises the refraction index and a rare earth element such as Nd (neodymium), Yb (ytterbium), Er (erbium), or Th (thorium) to quartz.

The clad 23 in this embodiment comprises an inner clad 25 having a corrugated shape and an outer clad (not shown) formed around the outer circumference of the inner clad 25. That is, the optical fiber 21 in this embodiment is a double-clad fiber in which the inner clad 25 is formed around the outer circumference of the core 22 and the outer clad is formed around the outer circumference of the inner clad 25. The inner clad 25 has a lower refraction index than the core 22. The refraction index of the outer clad is further lower than that of the inner clad 25.

The corrugated shape is a waveform shape in which the diameter of the outer circumference of the inner clad 25 continuously increases and decreases along the longitudinal direction of the optical fiber 21 in a cyclic manner. It suffices to form the corrugated part 24 at least on a side surface over which optical fiber segments are mutually adjacent (radial side of the optical fiber bundle 3 wound in a spiral form). Of course, the corrugated part 24 may be formed over the entire circumference of the optical fiber 21.

Figure 2:
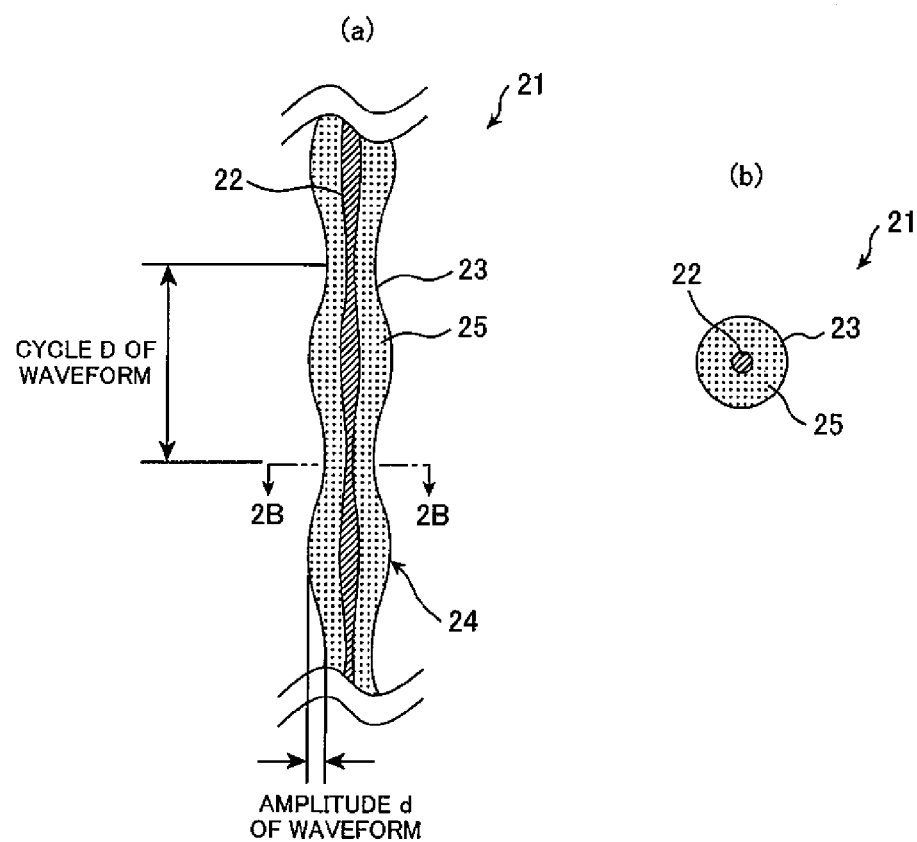
FIG. 2(a) is a schematic illustration showing a longitudinal cross sectional view of an optical fiber used in a method of excitation with the optical fiber laser that embodies the present invention.
FIG. 2(b) is a schematic illustration showing a lateral cross sectional view along line 2B-2B in FIG. 2(a).

Amplitude d of the corrugated shape of the inner clad 25 is defined as a difference between the maximum outer diameter and minimum outer diameter of the inner clad 25 (see FIG. 2 (a)). In this embodiment, the amplitude d of the corrugated shape of the inner clad 25 is 10% or less of the maximum outer diameter of the inner clad 25. This is because if the amplitude d of the corrugated shape of the inner clad 25 exceeds 10% of the maximum outer diameter of the inner clad 25, it will become hard to control the amplitude d and cycle D of the waveform of the corrugated shape during the manufacturing of the optical fiber 21. As with the inner clad 25, the core 22 of the optical fiber 21 also has a corrugated shape along the longitudinal direction of the optical fiber 21.

The optical fiber bundle 3 is preferably formed by winding and bundling the optical fiber 21 in a spiral form. In the optical fiber bundle 3, the corrugated parts 24 of the optical fiber 21 are disposed with an offset in the longitudinal direction so that the positions of the adjacent corrugated parts 24 of the optical fiber 21 do not match (specifically, so that the tops of the convex parts do not match each other, the bottoms of the concave parts do not match each other, and the top of the convex part and the bottom of the concave part do not match).

The laser bar 2 may be a one-dimensional array of light emitting devices (laser emitters) 2a that are integrally formed on a single board. The laser bar 2 is disposed on part of the outer circumference of the optical fiber bundle 3, which is its side. The laser bar 2 emits excitation light incident on a side of the optical fiber bundle 3.

Figure 3:
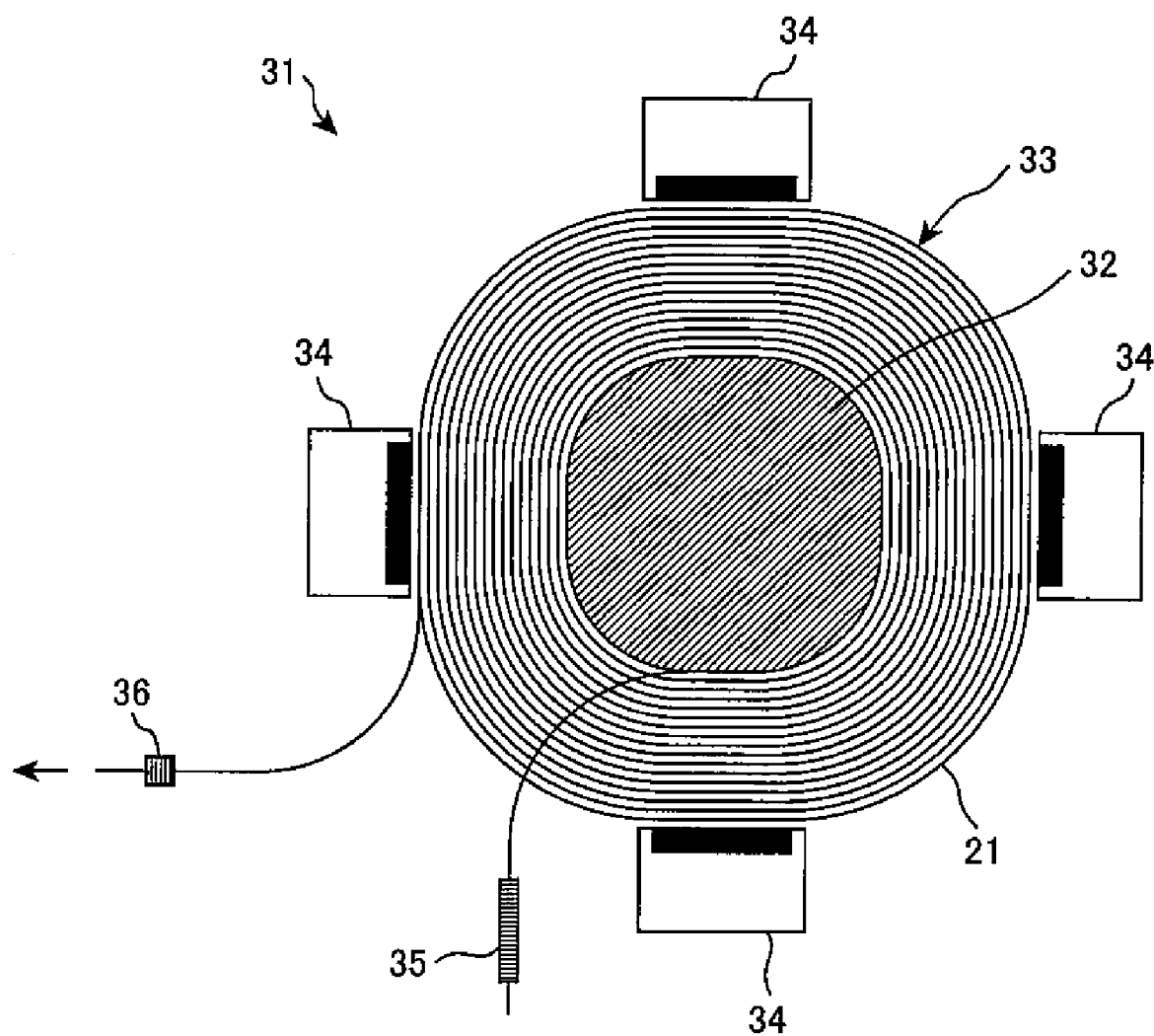
FIG. 3 is a schematic illustration showing a plane view of an example of the optical fiber laser that embodies the present invention.

The optical fiber laser 31 shown in FIG. 3 will be explained as an example of the optical fiber laser 1. FIG. 3 is a schematic illustration showing a plane view of an example of the optical fiber laser that embodies the present invention. As shown in FIG. 3, in the optical fiber laser 31, the optical fiber 21 is wound and bundled, in a spiral form, around a fiber winding member 32 with a substantially rectangular shape (rectangular shape with its corners rounded), when viewed from the top, so as to form an optical fiber bundle 3 with a substantially rectangular shape; four laser bars 34 are provided on edges (each arm of the rectangular shape) of the optical fiber bundle 3.

A resonator 35 with high reflectance is provided at one end of the optical fiber 21 extended from the inner circumference of the optical fiber bundle 3, and a resonator 36 with low reflectance is provided at the other end of the optical fiber 21 extended from the outer circumference of the optical fiber bundle 3. The resonators 35 and 36 may be, for example, fiber black gratings (FBGs).

Next, a method of excitation with the optical fiber laser that embodies the present invention will be described.

In the method of excitation with the optical fiber laser that embodies the present invention, excitation light is incident on a side of the optical fiber 21. As described before, the inner clad 25 of the optical fiber 21 has a corrugated shape along the longitudinal direction of the optical fiber 21. The optical fiber 21 is bundled in such a way that its adjacent sides are brought into contact with one another. Excitation light is incident on a side of the bundled optical fiber 21. More specifically, light emitting devices 2a of the laser bar 2, which is the light source for excitation, emit excitation light toward the side of the optical fiber 21 as an outermost optical fiber of the optical fiber bundle 3 (the leftmost optical fiber 21 in FIG. 1).

The inner clad 25 of the optical fiber 21 functions as a lens. A part of the excitation light being incident from the side is focused in the axial direction of the first turn (outermost) optical fiber 21. A part of excitation light that has passed through the first turn optical fiber 21 without being focused is incident on the side of the second turn optical fiber 21 (the second optical fiber 21 from the left in FIG. 1), and is focused in the axial direction of the second turn optical fiber 21. Furthermore, a part of excitation light that has passed through the second turn optical fiber 21 is incident on the side of the third turn optical fiber 21 (the third optical fiber from the left in FIG. 1). A part of excitation light that has passed through the third turn optical fiber 21 and later turns is handled in the same way.

The excitation light focused in the axial direction of the optical fiber 21 is absorbed by the core 22 while the excitation light propagates in the inner clad 25, so the core 22 emits fluorescence. The emitted fluorescence undergoes resonance by a resonance structure in which the high-reflectance resonator and low-reflectance resonator are paired, and are output as laser beams from the low-reflectance resonator disposed at the other end of the optical fiber 21.

Next, action in this embodiment will be described below. As described above, in the method of excitation with the optical fiber laser that embodies the present invention, the inner clad 25 of the optical fiber 21 has a corrugated shape along the longitudinal direction of the optical fiber 21; the optical fiber 21 is bundled in such a way that its adjacent sides are brought into contact with one another. Excitation light is incident on a side of the bundled optical fiber 21 (optical fiber bundle 3).

Since the optical fiber 21 with the inner clad 25, which has a corrugated shape along the longitudinal direction of the optical fiber 21, is used, excitation light incident from a side of the optical fiber 21 (in a radial direction of the optical fiber 21) is refracted at the corrugated parts 24 of the inner clad 25, so the excitation light beams can be easily focused in the axial direction of the optical fiber 21. Accordingly, more excitation light beams can be highly efficiently focused in the core 22 of the optical fiber 21 than when a conventional double-clad fiber without a corrugated shape is used.

Furthermore, since the optical fiber 21 is bundled in such a way that its adjacent sides are brought into contact with one another, when excitation light beams are incident on a side of the bundled optical fiber 21, excitation light beams that could not be focused in the core 22 of the first turn optical fiber 21 can be focused in the core 22 of the later turns optical fiber 21. Accordingly, the efficiency of optical coupling has increased.

Moreover, since the excitation light emitted from the laser bar 2 is incident directly on the outermost side of the optical fiber 21, there is no need to provide an optical device between the laser bar 2 and optical fiber 21. Therefore, a loss, that would be caused if an optical device is disposed therebetween, is eliminated and costs can also be reduced.

In the method of excitation with the optical fiber laser that embodies the present invention, the adjacent corrugated parts 24 of the optical fiber 21 are positioned with an offset so that they do not match. If the positions of the adjacent corrugated parts 24 of the optical fiber 21 match, when, for example, an excitation light beam passes a position at which the diameter of the inner clad 25 is maximized (the vertex of a convex part) and propagates straightly in a radial direction of the optical fiber 21, the excitation light beam passes all vertexes of convex parts in later turns. It then becomes difficult to refract the excitation light beam and focus it in the axial direction of the optical fiber 21. So, the adjacent corrugated parts 24 of the optical fiber 21 are disposed with an offset so that excitation light beams which have not been focused in the core 22 of the first turn optical fiber 21 are reliably focused in the later turns optical fiber 21.

The optical fiber 21 is wound in a spiral form to form the optical fiber bundle 3 in this embodiment, but this is not a limitation. In order to form the optical fiber bundle 3, the optical fiber 21 may be repeatedly folded or the optical fiber 21 may snake so that its adjacent sides are brought into contact with one another, for example. The laser bar 2 is used as the excitation light source in this embodiment, but this is not a limitation. A single light emitting device 2a may be used. Alternatively, a laser stack in which laser bars 2 are stacked may be used.

Next, the optical fiber 21 used in the method of excitation with the optical fiber laser that embodies the present invention will be described in more detail.

FIG. 2(a) is a schematic illustration showing a longitudinal cross sectional view of the optical fiber used in a method of excitation with the optical fiber laser that embodies the present invention; and FIG. 2(b) is a schematic illustration showing a lateral cross sectional view along line 2B-2B in FIG. 2(a). As shown in FIGS. 2(a) and 2(b), the optical fiber 21 is a double-clad fiber in which the inner clad 25 with a corrugated shape along the longitudinal direction of the optical fiber 21 is disposed around the outer circumference of the core 22 and the external clad (not shown) is disposed around the outer circumference of the inner clad 25.

The cycle D of the waveform of the corrugated shape of the inner clad 25 is set to a grating cycle during which the excitation light beam propagating in the optical fiber 21 is not released to the outside of the optical fiber 21 (outside of the inner clad 25) and thus is not attenuated. When, for example, the Yb as the rare earth element is added to the core 22, the wavelength of the excitation light is used in the range of 900 to 1000 nm to match its absorption characteristic (particularly, at 915 or 975 nm to match an absorption peak). Accordingly, the cycle of the corrugated part 24 in the longitudinal direction is set to the grating cycle during which the excitation light used within the range of 900 to 1000 nm is total internal reflected and propagates in the inner clad 25.

Figure 4:
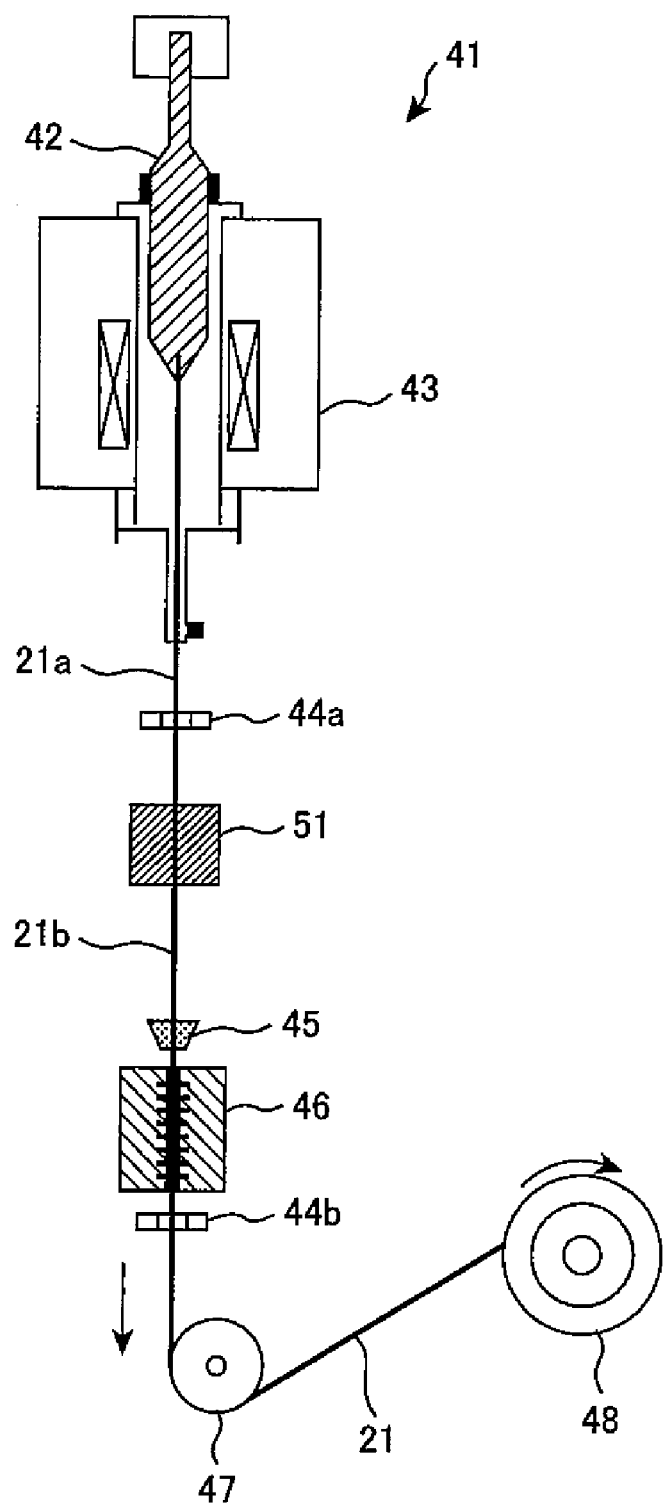
FIG. 4 is a schematic illustration showing an optical fiber manufacturing apparatus.

An optical fiber manufacturing apparatus 41 shown in FIG. 4 is preferably used to fabricate the optical fiber 21. FIG. 4 is a schematic illustration showing an optical fiber manufacturing apparatus. As shown in FIG. 4, the optical fiber manufacturing apparatus 41 has almost the same structure as conventional optical fiber manufacturing apparatuses, except a corrugated part forming unit 51 described later.

The optical fiber manufacturing apparatus 41 comprises: a wire drawing furnace 43 for heating an optical fiber base material 42; a first outer diameter measuring instrument 44a for measuring the outer diameter of a non-corrugated optical fiber 21a that has been drawn after a melting process in the wire drawing furnace 43; a corrugation part forming unit 51 for forming the corrugated part 24 shown in FIG. 2(a) around the non-corrugated optical fiber 21a that has passed through the first outer diameter measuring instrument 44a to form a corrugated optical fiber 21b; a dice 45 (for fiber covering resin) for covering the corrugated optical fiber 21b with a covering material used to form an external clad; a curing unit 46 for curing the covering material to form the optical fiber 21 shown in FIGS. 2(a) and 2(b); a second outer diameter measuring instrument 44b for measuring the outer diameter of the optical fiber 21 that has passed through the curing unit 46; a turn pulley 47 for turning around the optical fiber 21 and feeding it downstream; and a takeup unit 48 for winding up the optical fiber 21 fed from the turn pulley 47.

The curing unit 46 can be replaced appropriately according to the type of covering material; when thermosetting resin such as polyimide is used, a heater is used; when ultraviolet (UV) curing resin is used, a UV lamp or the like is used. The takeup unit 48 also functions as a straining means to give tension to the corrugated optical fiber 21b during the wire drawing process and to the optical fiber 21.

Figure 5:
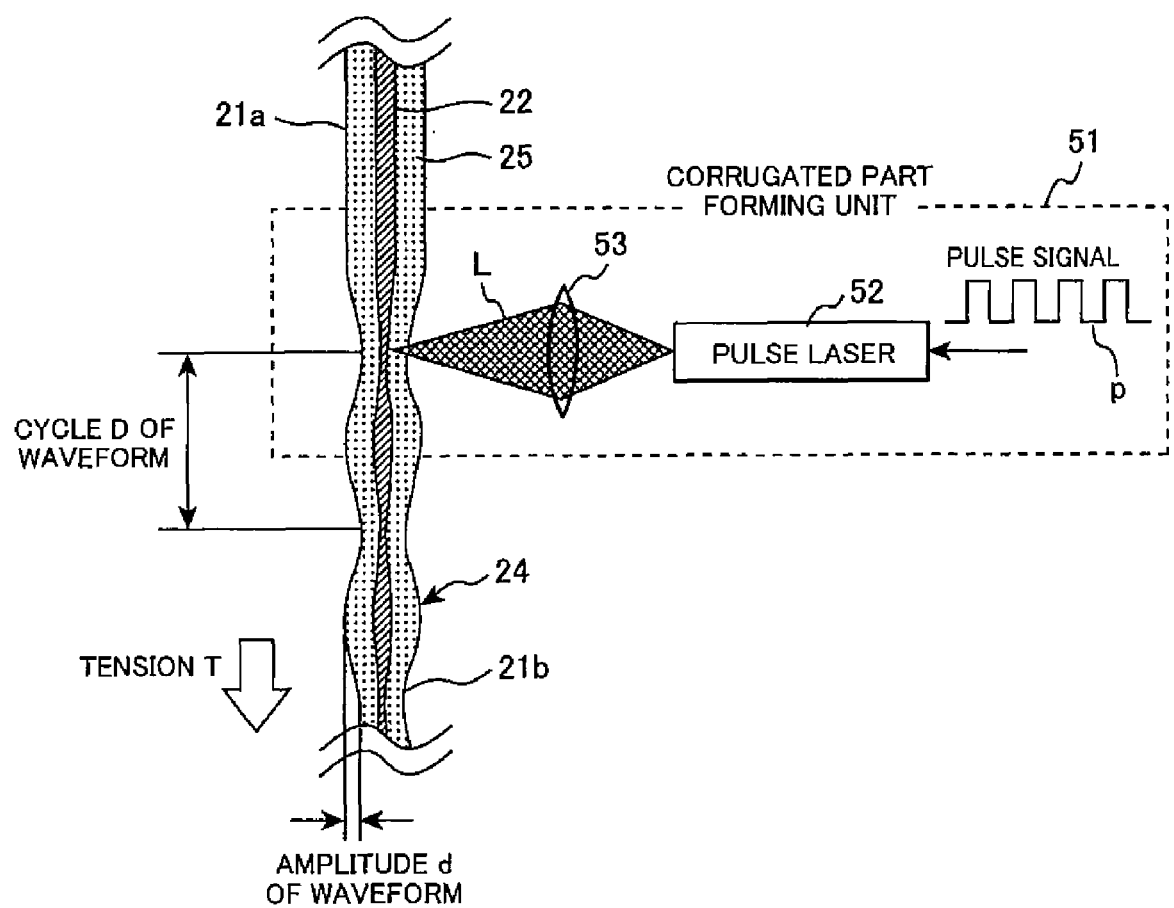
FIG. 5 is a schematic illustration showing an exemplary method of manufacturing the optical fiber having a corrugated part shown in FIGS. 2(a) and 2(b).

An example of the corrugated part forming unit 51 will be described below in detail with reference to FIG. 5. FIG. 5 is a schematic illustration showing an exemplary method of manufacturing the optical fiber having a corrugated part shown in FIGS. 2(a) and 2(b). The corrugated part forming unit 51 periodically (intermittently) gives pulse laser beams L to the non-corrugated optical fiber 21a in the line drawing process, as shown in FIG. 5. The corrugated part forming unit 51 includes a pulse laser 52 for emitting the pulse laser beams L and a condenser lens 53 for focusing the pulse laser beams L, the condenser lens 53 being disposed movably forward and backward between the pulse laser 52 and the non-corrugated optical fiber 21a in the line drawing process.

A $CO_2$ laser, YAG laser, semiconductor laser, fiber laser, or the like can be used as the laser built into the pulse laser 52, but this is not a limitation; any other lasers cab be used if they can locally illuminate the non-corrugated optical fiber 21a in the line drawing process and have light focusing characteristics. A pulse signal p which has a pulse width equal to half the corrugation cycle D and a pulse height corresponding to the corrugation amplitude d is input to the pulse laser 52 with the line drawing speed considered so that the pulse laser 52 cyclically gives high-output thermal energy to the non-corrugated optical fiber 21a in the line drawing process.

When the high-output thermal energy is locally given to the non-corrugated optical fiber 21a in the line drawing process, the local part of the non-corrugated optical fiber 21a is molten and softened. Since tension T has been applied to the non-corrugated optical fiber 21a by the takeup unit 38, the molten part is prolonged and thinned. The core 22 and inner clad 25 then have corrugated parts 24 along the longitudinal direction of the optical fiber, resulting in the corrugated optical fiber 21b. The external clad is then formed around the corrugated optical fiber 21b to obtain the optical fiber 21.

During formation of the corrugated part 24, changing the values of the pulse cycle, laser energy, tension T, and other parameters can change the values of the corrugation cycle D and corrugation amplitude d. It is thereby possible to change the absorption efficiency of the excitation light beam to a desired value by appropriately changing these parameters to change the corrugation cycle D and corrugation amplitude d.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical fiber laser that has an optical fiber comprising a core to which a rare earth element is added and a clad disposed around the core, and also has an excitation light source for emitting excitation light incident on a side of the optical fiber;
   wherein the clad has corrugated parts in a corrugated shape, a diameter of an outer circumference of the corrugated parts continuously increasing and decreasing in a cyclic manner along a longitudinal direction of the optical fiber;
   wherein the optical fiber is wound in a spiral form with a plurality of turns and is bundled in such a way that adjacent sides of the corrugated parts of the clad are brought into contact with one another, and that the excitation light beams are incident across the turns of the optical fiber; and
   wherein the optical fiber is wound in such a way that:
   tops of convex parts in the corrugated parts of adjacent turned optical fibers do not match each other;
   bottoms of concave parts in the corrugated parts of adjacent turned optical fibers do not match each other; and
   the bottoms of the concave part and the top of the convex part in the corrugated parts of adjacent turned optical fibers do not match each other.

2. The optical fiber laser according to claim 1, wherein: the amplitude of the corrugated shape of the clad is 10% or less of the diameter of the clad.

3. A method of excitation with an optical fiber laser that has an optical fiber comprising a core to which a rare earth element is added and a clad disposed around the core for outputting laser-excited light beams, including irradiating excitation light to a side of the optical fiber and exciting the rare earth element included in the core
   wherein the clad has corrugated parts in a corrugated shape, a diameter of an outer circumference of the corrugated parts continuously increasing and decreasing in a cyclic manner along a longitudinal direction of the optical fiber;
   wherein the optical fiber is wound in a spiral form with a plurality of turns and is bundled in such a way that adjacent sides of the corrugated parts of the clad are brought into contact with one another; and
   wherein the optical fiber is wound in such a way that:
   tops of convex parts in the corrugated parts of adjacent turned optical fibers do not match each other;
   bottoms of concave parts in the corrugated parts of adjacent turned optical fibers do not match each other; and
   the bottoms of the concave part and the top of the convex part in the corrugated parts of adjacent turned optical fibers do not match each other; and
   irradiating the excitation light beams so as to be incident across the turns of the optical fiber.

4. The optical fiber laser according to claim 1, wherein the corrugated parts of the clad work as a lens for focusing the incident excitation light beams to the core.

5. The method of excitation with an optical fiber laser according to claim 3, wherein the corrugated parts of the clad work as a lens for focusing the incident excitation light beams to the core.

* * * * *